United States Patent
Lin et al.

(10) Patent No.: US 11,395,166 B2
(45) Date of Patent: Jul. 19, 2022

(54) UE PDCCH MONITORING CAPABILITY REPORTING

(71) Applicant: Samsung Electronics Co., Ltd., Suwon-si (KR)

(72) Inventors: Hsien-Ping Lin, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/890,961

(22) Filed: Jun. 2, 2020

(65) Prior Publication Data
US 2021/0029561 A1     Jan. 28, 2021

Related U.S. Application Data

(60) Provisional application No. 62/878,107, filed on Jul. 24, 2019.

(51) Int. Cl.
| | |
|---|---|
| *H04W 72/04* | (2009.01) |
| *H04W 24/08* | (2009.01) |
| *H04W 8/24* | (2009.01) |

(52) U.S. Cl.
CPC ............ *H04W 24/08* (2013.01); *H04W 8/24* (2013.01); *H04W 72/042* (2013.01); *H04W 72/0446* (2013.01)

(58) Field of Classification Search
CPC ..... H04W 24/08; H04W 8/24; H04W 72/042; H04W 72/0446; H04W 72/0493; H04W 72/1242; H04W 72/1289; H04L 1/0038
See application file for complete search history.

(56) References Cited

U.S. PATENT DOCUMENTS

| | | | |
|---|---|---|---|
| 8,892,091 B2 | 11/2014 | Schmidt et al. | |
| 9,049,708 B2 | 6/2015 | Freda et al. | |
| 9,572,063 B2 * | 2/2017 | Etemad | H04L 45/306 |
| 9,578,625 B2 | 2/2017 | Seo et al. | |
| 9,642,181 B2 | 5/2017 | Feuersaenger et al. | |
| 10,075,851 B1 * | 9/2018 | Marupaduga | H04W 16/14 |
| 2013/0242780 A1 | 9/2013 | Dayal et al. | |

(Continued)

OTHER PUBLICATIONS

3rd Generation Partnership Project (3GPP), "Remaining Issues in R-15 UE Features", 3GPP TSG RAN WG1 #96bis, Xi'an, China, Apr. 8-12, 2019, 3 pages, https://www.3gpp.org/DynaReport/TDocExMtg--R1-96b--32822.htm.

(Continued)

*Primary Examiner* — Wei Zhao
(74) *Attorney, Agent, or Firm* — Lewis Roca Rothgerber Christie LLP

(57) ABSTRACT

A method for monitoring capability reporting. In some embodiments, the method includes: receiving, by a network, from a user equipment (UE), a physical downlink control channel (PDCCH) monitoring capability, the PDCCH monitoring capability including: a span pattern requirement specifying one or more restrictions on lengths and separations, and a minimum time separation requirement, the minimum time separation requirement specifying a minimum time separation between downlink control informations (DCIs). The method may further include generating, by the network, in response to the PDCCH monitoring capability, a first monitoring occasion (MO) pattern.

20 Claims, 5 Drawing Sheets

(56) References Cited

U.S. PATENT DOCUMENTS

| | | | |
|---|---|---|---|
| 2014/0206341 A1 | 7/2014 | Siomina et al. | |
| 2018/0063865 A1 | 3/2018 | Islam et al. | |
| 2019/0363824 A1* | 11/2019 | Sun | H04L 5/0053 |
| 2020/0037389 A1 | 1/2020 | Feuersaenger et al. | |
| 2021/0022121 A1 | 1/2021 | Lin et al. | |

OTHER PUBLICATIONS

3$^{rd}$ Generation Partnership Project (3GPP) Technical Report 38.822 Release 15 version 15.0.1 clause 4.1, Jul. 25, 2019, available at https://www.3gpp.org/ftp//Specs/archive/38_series/38.822/38822-f01.zip.
3rd Generation Partnership Project (3GPP) Technical Specification 38.213 Release 15 version 15.9.0 clause 9.1.3, Apr. 3, 2020, available at https://www.3gpp.org/ftp//Specs/archive/38_series/38.213/38213-f90.zip.
3rd Generation Partnership Project (3GPP) Technical Specification 38.213 Release 16 version 16.1.0 clause 9.1.3, Apr. 3, 2020, available at https://www.3gpp.org/ftp//Specs/archive/38_series/38.213/38213-g10.zip.
3rd Generation Partnership Project (3GPP) Technical Specification 38.306 Release 15 version 15.9.0 clause 4.2.7.5, Apr. 6, 2020, available at https://www.3gpp.org/ftp//Specs/archive/38_series/38.306/38306-f90.zip.
3rd Generation Partnership Project (3GPP) Technical Specification 38.306 Release 16 version 16.0.0 clause 4.2.7.5, Apr. 8, 2020, available at https://www.3gpp.org/ftp//Specs/archive/38_series/38.306/38306-g00.zip.
Ericsson, "Benefits of Enhanced PDCCH Monitoring Capability for URLLC," 3GPP TSG-RAN WG1 Meeting #97, May 2019, 8 pages.
Ericsson, "Improving PDCCH Monitoring Capability on a Monitoring Span," 3GPP TSG-RAN WG1 Meeting #97, May 2019, 3 pages.
Huawei, "Summary of 7.2.6.1 PDCCH enhancements," 3GPP TSG-RAN WG1 Meeting #96bis, Apr. 2019, 65 pages.
NTT Docomo, Inc., "Summary on UE feature related discussion in 7.1.7," 3GPP TSG-RAN WG1 Meeting #96bis, Apr. 2019, 19 pages.
EPO Extended Search Report dated Nov. 3, 2020, issued in corresponding European Patent Application No. 20184898.3 (11 pages).

* cited by examiner

| Reporting | FG 3-5a | FG 3-5b | Ability to transmit as shown in FIG. 2A) | Ability to transmit as shown in FIG. 2B) |
|---|---|---|---|---|
| Single | Reported (DCI gap) | Not reported | Yes | No |
| Single | Not reported (No DCI gap) | (2,2),(4,3),(7,3) | No | Yes |
| Dual (both 3-5a and 3-5b) | Reported (DCI gap) | (2,2),(4,3),(7,3) | Yes | Yes |

FIG. 2C

UE PDCCH MONITORING CAPABILITY REPORTING

CROSS-REFERENCE TO RELATED APPLICATION(S)

The present application claims priority to and the benefit of U.S. Provisional Application No. 62/878,107; filed Jul. 24, 2019, entitled "SYSTEM AND METHOD FOR PROVIDING PHYSICAL DOWNLINK CONTROL CHANNEL (PDCCH) MONITORING CAPABILITY SIGNALING INTERPRETATION", the entire content of which is incorporated herein by reference.

FIELD

One or more aspects of embodiments according to the present disclosure relate to 5G communications, and more particularly to the scheduling of transmission of downlink control information (DCI) in a 5G connection.

BACKGROUND

In a 5G connection between a network and a user equipment (UE), the UE may communicate to the network the UE's PDCCH monitoring capability under feature group 3-5a or under feature group 3-5b, and the network may then send to the UE a scan pattern and one or more DCIs complying with the communicated capability. Such a configuration may result in a failure to achieve a level of performance of which the network and the UE are capable, and it may result in a failure to take full advantage of the capabilities of the UE.

Thus, there is a need for an improved system and method for UE PDCCH monitoring capability reporting.

SUMMARY

According to an embodiment of the present invention, there is provided a method, including: receiving, by a network, from a user equipment (UE), a physical downlink control channel (PDCCH) monitoring capability report, the PDCCH monitoring capability report including: a span pattern requirement specifying one or more restrictions on lengths and separations, and a minimum time separation requirement, the minimum time separation requirement specifying a minimum time separation between downlink control informations (DCIs); and generating, by the network, in response to the PDCCH monitoring capability report, a first monitoring occasion (MO) pattern.

In some embodiments, the method further includes: sending, by the network, to the UE, the first MO pattern, the first MO pattern complying with the span pattern requirement, and sending, by the network, to the UE, a first DCI, and a second DCI separated from the first DCI by less than the minimum time separation.

In some embodiments, the method further includes: sending, by the network, to the UE, a second monitoring occasion (MO) pattern, not complying with the span pattern requirement, and sending, by the network, to the UE, a third DCI, and a fourth DCI separated from the third DCI by at least the minimum time separation.

In some embodiments, the method further includes: sending, by the network, to the UE, the first MO pattern, the first MO pattern not complying with the span pattern requirement, and sending, by the network, to the UE, a first DCI, and a second DCI separated from the first DCI by at least the minimum time separation.

In some embodiments, the minimum time separation requirement specifies an absence of a DCI in a symbol immediately following a symbol with a DCI, the method further including disabling, by the UE, DCI reception during a symbol immediately following the first DCI.

In some embodiments, the method further includes: sending, by the network, to the UE, the first MO pattern, the first MO pattern complying with the span pattern requirement, and sending, by the network, to the UE, a first DCI, and a second DCI separated from the first DCI by at least the minimum time separation.

In some embodiments, the minimum time separation requirement specifies an absence of a DCI in a symbol immediately following a symbol with a DCI, the method further including: sending, by the network, to the UE, a notification that the network will comply with the minimum time separation requirement; and disabling, by the UE, DCI reception during a symbol immediately following the first DCI.

According to an embodiment of the present invention, there is provided a method, including: receiving, by a network, from a first user equipment (UE), a first physical downlink control channel (PDCCH) monitoring capability report; and receiving, by the network, from a second UE, the first PDCCH monitoring capability report, the first PDCCH monitoring capability report including: a span pattern requirement specifying one or more restrictions on lengths and separations, and a minimum time separation requirement, the minimum time separation requirement specifying a minimum time separation between downlink control informations (DCIs) generating, by the network, in response to the first PDCCH monitoring capability report, a first monitoring occasion (MO) pattern.

In some embodiments, the method further includes: sending, by the network, to the first UE, the first MO pattern, the first MO pattern complying with the span pattern requirement, and sending, by the network, to the first UE, a first DCI, and a second DCI separated from the first DCI by less than the minimum time separation.

In some embodiments, the method further includes: sending, by the network, to the second UE, a second monitoring occasion (MO) pattern, not complying with the span pattern requirement, and sending, by the network, to the second UE, a third DCI, and a fourth DCI separated from the third DCI by at least the minimum time separation.

In some embodiments, the method further includes: sending, by the network, to the first UE, the first MO pattern, the first MO pattern not complying with the span pattern requirement, and sending, by the network, to the first UE, a first DCI, and a second DCI separated from the first DCI by at least the minimum time separation.

In some embodiments, the minimum time separation requirement specifies an absence of a DCI in a symbol immediately following a symbol with a DCI, the method further including disabling, by the first UE, DCI reception during a symbol immediately following the first DCI.

In some embodiments, the method further includes: sending, by the network, to the first UE, the first MO pattern, the first MO pattern complying with the span pattern requirement, and sending, by the network, to the first UE, a first DCI, and a second DCI separated from the first DCI by at least the minimum time separation.

In some embodiments, the minimum time separation requirement specifies an absence of a DCI in a symbol immediately following a symbol with a DCI, the method further including: sending, by the network, to the first UE, a notification that the network will comply with the minimum time separation requirement; and disabling, by the first UE, DCI reception during a symbol immediately following the first DCI.

According to an embodiment of the present invention, there is provided a system, including: a network, including a first processing circuit; and a user equipment (UE), including a second processing circuit, the second processing circuit being configured to report, to the network, a physical downlink control channel (PDCCH) monitoring capability report, the PDCCH monitoring capability report including: a span pattern requirement specifying one or more restrictions on lengths and separations, and a minimum time separation requirement, the minimum time separation requirement specifying a minimum time separation between downlink control informations (DCIs).

In some embodiments, the first processing circuit is configured to: send, to the UE, a first monitoring occasion (MO) pattern, complying with the span pattern requirement, and send, to the UE, a first DCI, and a second DCI separated from the first DCI by less than the minimum time separation.

In some embodiments, the first processing circuit is further configured to: send, to the UE, a second monitoring occasion (MO) pattern, not complying with the span pattern requirement, and send, to the UE, a third DCI, and a fourth DCI separated from the third DCI by at least the minimum time separation.

In some embodiments, the first processing circuit is further configured to: send, to the UE, a first monitoring occasion (MO) pattern, not complying with the span pattern requirement, and send, to the UE, a first DCI, and a second DCI separated from the first DCI by at least the minimum time separation.

In some embodiments, the minimum time separation requirement specifies an absence of a DCI in a symbol immediately following a symbol with a DCI, and wherein the second processing circuit is further configured to disable DCI reception during a symbol immediately following the first DCI.

In some embodiments, the minimum time separation requirement specifies an absence of a DCI in a symbol immediately following a symbol with a DCI wherein: the first processing circuit is further configured to: send, to the UE, a first monitoring occasion (MO) pattern, complying with the span pattern requirement, send, to the UE, a first DCI, and a second DCI separated from the first DCI by at least the minimum time separation, and send, to the UE, a notification that the network will comply with the minimum time separation requirement; and the second processing circuit is further configured to disable DCI reception during a symbol immediately following the first DCI.

BRIEF DESCRIPTION OF THE DRAWINGS

These and other features and advantages of the present disclosure will be appreciated and understood with reference to the specification, claims, and appended drawings wherein:

FIG. 2A is a symbol sequence diagram, according to an embodiment of the present disclosure;

FIG. 2B is a symbol sequence diagram, according to an embodiment of the present disclosure;

FIG. 2C is a table of configuration options, according to an embodiment of the present disclosure.

DETAILED DESCRIPTION

The detailed description set forth below in connection with the appended drawings is intended as a description of exemplary embodiments of a system and method for UE PDCCH monitoring capability reporting provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
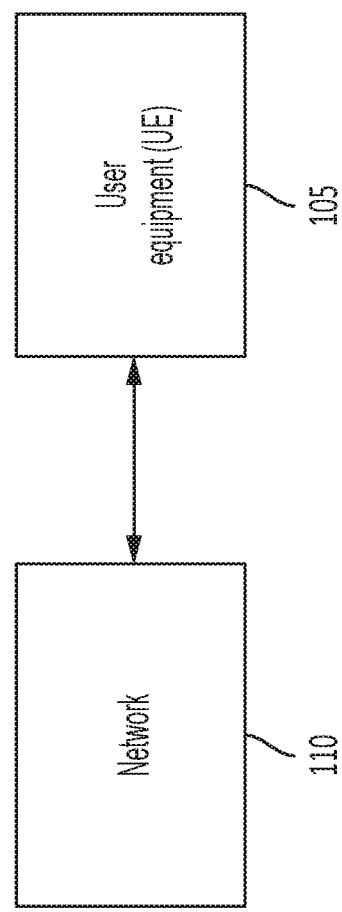
FIG. 1 is a block diagram, according to an embodiment of the present disclosure.

FIG. 1 is a simplified block diagram of two components of a 5G communication system, in some embodiments. A user equipment (UE) 105 forms a connection (e.g., a wireless connection) with a network 110 (e.g., with a base station of the network 110). In a 5G communication system, the physical downlink control channel (PDCCH) monitoring capability of a user equipment (UE) may be signaled from the UE to the network (e.g., to a base station (BS)) such that the network may then employ a downlink control information (DCI) monitoring configuration for the UE that is within the capabilities of the UE. As used herein, certain phrases, such as "user equipment" and "downlink control information" (discussed in further detail below) are used as countable nouns even though the nouns they contain (e.g., "equipment" and "information") may not be countable in ordinary English. In the conventions of 5G, two UE capability feature groups, UE capability feature group (FG) 3-5a and UE capability feature group 3-5b define possible UE capabilities with respect to PDCCH monitoring.

Based on the component description of feature group FG 3-5b (in the technical specification identified as TS 38.822, published by the 3rd Generation Partnership Project), the UE may report one of $\{(7,3)\}$, $\{(4,3), (7,3)\}$, and $\{(2,2), (4,3), (7,3)\}$ as a candidate value set $\{(X,Y)\}$, and the PDCCH monitoring configuration generated by the network is expected to comply with the reported span gap and span length limitations. A span consists (as clarified in the RAN1 #96bis meeting of the 3rd Generation Partnership Project) of consecutive symbols within a slot and the span pattern within a slot is determined based on (i) a PDCCH monitoring occasion (MO) pattern, (ii) a set of one or more ordered pairs (X,Y) identified in a report (under feature group FG 3-5b) sent to the network by the UE, and (iii) the control resource set (CORESET) configuration for the user equipment (UE). In particular, spans within a slot have the same duration which is determined by max{maximum value of all CORESET durations, minimum value of Y in the UE reported candidate value} except possibly the last span in a slot which can be of shorter duration. The first span in the span pattern within a slot begins at the symbol of the smallest index for which a monitoring occasion is configured to the UE. The next span begins with an MO which is not included in the first span and the same procedure is applied to construct the following spans. The separation (or "span gap") between the respective starts of any two consecutive spans within and across slots must satisfy the same (X,Y) limit, where X represents the minimum time separation of OFDM symbols between the respective starts of two spans, and Y represents the maximum number of consecutive OFDM symbols for each span. A UE may (according to Release 15 of the 5G standard, for example) report its monitoring capability from three possible sets: {(7,3)}, {(4,3), (7,3)}, {(2,2), (4,3), (7,3)}.

There is another PDCCH monitoring capability, described in FG 3-5a, which constrains a symbol-based gap between two downlink (DL) unicast DCIs, between two uplink (UL) unicast DCIs, or between a DL and an UL unicast DCI in different monitoring occasions. As such, under FG 3-5a, a UE may (i) not report a capability, (ii) report that a "gap restriction" is needed, i.e., that to be processed by the UE, successive DCIs must be separated by a certain minimum number of symbols (the required number of symbols depending on the subcarrier spacing (SCS) in the manner defined in TS 38.822), or (iii) report that no gap restriction is needed.

When a UE reports its PDCCH monitoring capability within FG 3-5a, the network is expected, in transmitting DCIs to the UE, to follow the reported gap limitation. Similarly, when a UE reports its PDCCH monitoring capability within FG 3-5b, the MOs pattern generated, and transmitted to the UE, by the network is expected to follow the reported span restriction.

In some embodiments, the UE may both (i) report its capability within FG 3-5a (reporting a minimum time separation, the minimum time separation requirement specifying a minimum time separation (or "gap") between DCIs), and (ii) report its capability within FG 3-5b (reporting a span pattern requirement specifying one or more restrictions on lengths and separations) and the network may elect to comply with one or the other, or both. As used herein, the reporting of a capability within FG 3-5a (whether the reported capability is (i) no "gap restriction", i.e., no minimum time separation between DCIs is required, or (ii) a gap restriction, i.e., the minimum time separation must be (a) 2OFDM symbols for 15 kHz (b) 4OFDM symbols for 30 kHz, (c) 7OFDM symbols for 60 kHz with NCP, or (d) 11OFDM symbols for 120 kHz) is an example of reporting a minimum time separation requirement, the minimum time separation requirement specifying a minimum time separation between downlink (DCIs). As used herein, the reporting of a capability within FG 3-5b is an example of reporting a span pattern requirement.

Dual reporting, i.e., the reporting, by a UE, of its capabilities both under FG 3-5a and under FG 3-5b, may result (i) in the network's having increased flexibility to schedule MOs and DCIs, (ii) in improved performance, and (iii) in better taking advantage of the capabilities of the UE, as the following examples (which assume that the UE reports a capability under FG 3-5b with {(2,2), (4,3), (7,3)} and that the UE reports a capability under FG 3-5a with a DCI gap restriction) illustrate.

Figure 2A:
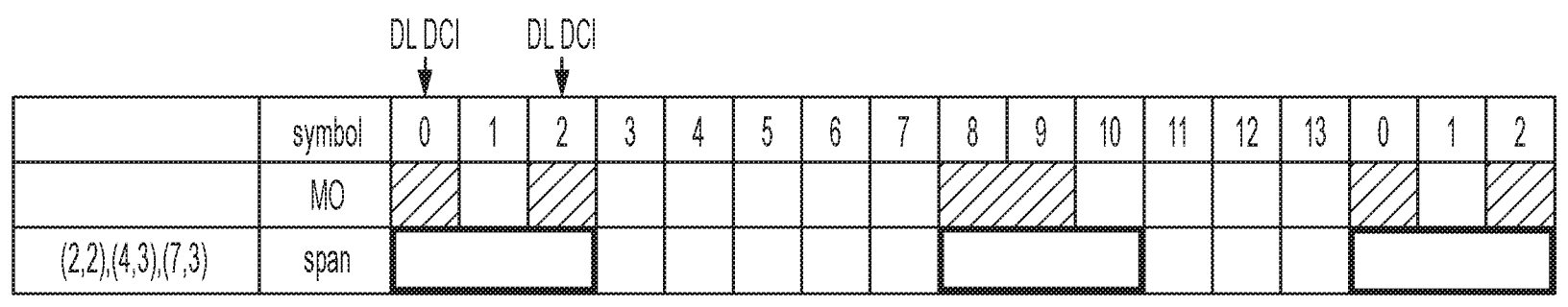

FIG. 2A shows a configuration in which the subcarrier spacing (SCS)=15 kHz, frequency division duplex (FDD) is used, and CORESET duration is 3 symbols. In this case, each span consists of 3 symbols and the span gap for any two spans is at least 4 symbols. Furthermore, because the UE reported a gap restriction under FG 3-5a, the network is expected to allow a gap of at least 2 symbols between any two DCIs (2 symbols being the gap specified by TS 38.822 when the UE reports a gap restriction under FG 3-5a and the SCS is 15 kHz). Consequently, the MO configuration in FIG. 2A is valid in terms of the span restriction of FG 3-5b and the DCI transmission is valid in terms of the DCI gap restriction of FG 3-5a. However, the DCI transmission violates FG 3-5b, which requires that each span can only contain one downlink (DL) DCI. In other words, if a UE only reports a PDCCH monitoring capability under FG 3-5b (and not under FG 3-5a), the network will not be able to transmit the DCIs shown in FIG. 2A.

Figure 2B:
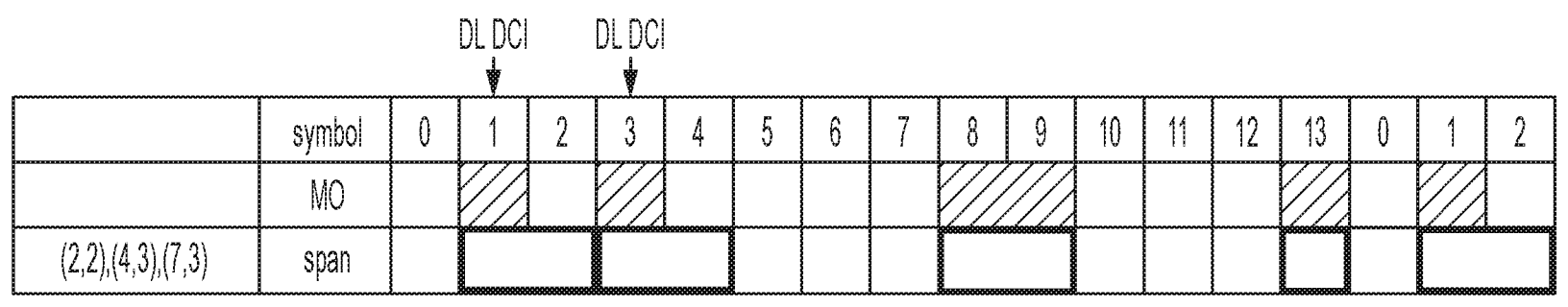

As another example, FIG. 2B shows a configuration in which SCS=30 kHz, frequency division duplex (FDD) is used, and the CORESET duration is 2 symbols. In this case, each span consists of 2 symbols and the span gap for any two spans is at least 2 symbols. Furthermore, because the UE reported a gap restriction under FG 3-5a, the network is expected to allow a gap of at least 4 symbols between any two DCIs (4 symbols being the gap specified by TS 38.822 when the UE reports a gap restriction under FG 3-5a and the SCS is 30 kHz). Consequently, the MO configuration in FIG. 2B is valid in terms of the span restriction of FG 3-5b and the DCI transmission is valid in terms of the number of DCIs within a span based on FG 3-5b. However, the DCI transmission violates FG 3-5a under which the network is expected to provide a gap of 4 symbols gap between any two DCIs. In other words, if a UE only reports a PDCCH monitoring capability under FG 3-5a (and not under FG 3-5b), the network will not be able to transmit the DCIs shown in FIG. 2B.

If the UE reports its capabilities under both FG 3-5a and FG 3-5b, and if, as mentioned above, the network may elect to comply with one or the other, or both, then in each of the examples of FIG. 2A and FIG. 2B, the network is able to make an election making possible the transmission shown. In the situation of FIG. 2A, the network may elect to comply with the capability reported under 3-5a, making the transmission illustrated in FIG. 2A permissible, and in the situation of FIG. 2B, the network may elect to comply with the capability reported under 3-5b, making the transmission illustrated in FIG. 2B permissible. The table FIG. 2C summarizes these observations. As shown in this table, the single-reporting circumstances described above for FIG. 2A (reporting only under 3-5b) and FIG. 2B (reporting only under 3-5a) do not result in the respective illustrated transmissions being permissible, whereas dual reporting (of the UE's PDCCH monitoring capability, under both 3-5a and 3-5b) results in both of the transmissions illustrated in FIG. 2A and FIG. 2B being permissible.

In a system implementing (dual) reporting of PDCCH monitoring capabilities under both FG 3-5a and FG 3-5b, it may be the case that on a first occasion on which a UE connects to a network and reports its capabilities under both FG 3-5a and FG 3-5b, the network elects to comply with the span pattern requirement (of FG 3-5b) and not to comply with the minimum time separation requirement (of FG 3-5a), and it may send to the UE (i) a first monitoring occasion (MO) pattern, complying with the span pattern requirement, and (ii) two DCIs separated by less than the minimum time separation. It may then occur that on a second occasion on which the UE connects to the network, the network elects not to comply with the span pattern requirement (of FG 3-5b) and to comply with the minimum time separation requirement (of FG 3-5a), and it may send to the UE a second monitoring occasion (MO) pattern, not complying with the span pattern requirement.

Similarly, it may be the case that when a first UE connects to a network and reports its capabilities under both FG 3-5a and FG 3-5b, the network elects to comply with the span pattern requirement (of FG 3-5b) and not to comply with the minimum time separation requirement (of FG 3-5a), and when a second UE connects to the network and reports the same PDCCH monitoring capabilities as those that were reported by the first UE, the network elects, in its interactions with the second UE, not to comply with the span pattern requirement (of FG 3-5b) and to comply with the minimum time separation requirement (of FG 3-5a).

When a UE reports its PDCCH monitoring capabilities under both FG 3-5a and FG 3-5b, it may be advantageous for the UE to infer, from the behavior of the network, whether the network has elected to comply with the capability reported under FG 3-5a or with the capability reported under FG 3-5b. This may make it possible (e.g., if the reported capability under FG 3-5a is a gap restriction that specifies an absence of a DCI in a symbol immediately following a symbol with a DCI) for the UE to rule out certain symbols (e.g., any symbol immediately following a symbol with a DCI) as potentially containing a DCI, and the UE may disable DCI reception during those symbols, e.g., to save power.

Figure 3:
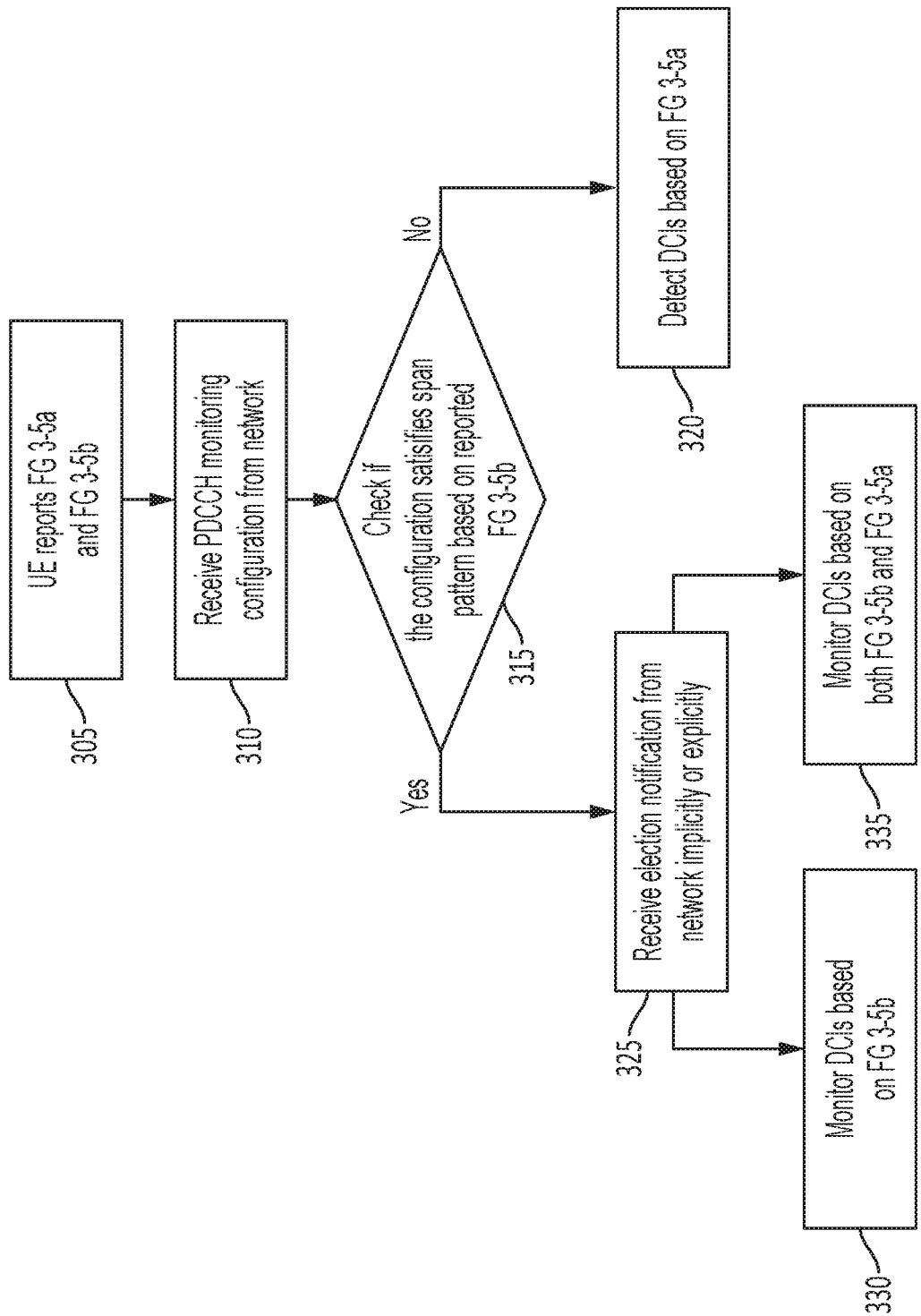
FIG. 3 is a flow chart, according to an embodiment of the present disclosure.

As shown in FIG. 3, the UE reports its PDCCH monitoring capabilities under both FG 3-5a and FG 3-5b at 305, and receives a PDCCH monitoring configuration from the network at 310. At 315, the UE determines whether the PDCCH monitoring configuration complies with the capability that the UE reported under FG 3-5b; if it does not, then the UE infers that the network has elected to comply with the PDCCH monitoring capabilities reported by the UE under 3-5a, and it detects DCIs accordingly, at 320. This may involve disabling DCI reception immediately after a DCI is received, if the PDCCH monitoring capability the UE reported under FG 3-5a was a gap restriction.

If, at 315, the UE determines that the PDCCH monitoring configuration complies with the capability that the UE reported under FG 3-5b, then the UE may be unable to determine, based on the PDCCH monitoring configuration received from the network, whether (i) the network has elected to comply only with the capability that the UE reported under FG 3-5b or (ii) the network has elected to comply with the capabilities under both FG 3-5a and FG 3-5b. If, however, the network sends, and (at 325) the UE receives, an election notification, notifying the UE which capability or capabilities the network has elected to comply with, then the UE may monitor DCIs accordingly, at 330 or 335. This election notification may be explicit, e.g., a specific signal sent by the network to the UE, or it may be implicit, e.g., another configuration setting used by the network, from which the UE is able to infer the election made by the network.

In some embodiments, the network includes a first processing circuit (e.g., one or more CPUs), and the UE contains a processing circuit. The processing circuits may perform the some or all of the methods described herein, e.g., sending and receiving (through suitable transmitting and receiving hardware, such as radio, microwave, or mm-wave transmitters and receivers) some of which may be external to the processing circuits) configuration information, capability information, and DCIs. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for UE PDCCH monitoring capability reporting have been specifically described and illustrated herein, many modifications and variations will be apparent to those skilled in the art. Accordingly, it is to be understood that a system and method for UE PDCCH monitoring capability reporting constructed according to principles of this disclosure may be embodied other than as specifically described herein. The invention is also defined in the following claims, and equivalents thereof.

What is claimed is:

1. A method, comprising:
    receiving, by a network, from a user equipment (UE), a physical downlink control channel (PDCCH) monitoring capability report, the PDCCH monitoring capability report including:
        a span pattern requirement specifying one or more restrictions on lengths and separations, and
        a minimum time separation requirement, the minimum time separation requirement specifying a minimum time separation between downlink control informations (DCIs); and
    generating, by the network, in response to the PDCCH monitoring capability report, a first monitoring occasion (MO) pattern.

2. The method of claim 1, further comprising:
    sending, by the network, to the UE, the first MO pattern, the first MO pattern complying with the span pattern requirement, and
    sending, by the network, to the UE, a first DCI, and a second DCI separated from the first DCI by less than the minimum time separation.

3. The method of claim 2, further comprising:
    sending, by the network, to the UE, a second monitoring occasion (MO) pattern, not complying with the span pattern requirement, and
    sending, by the network, to the UE, a third DCI, and a fourth DCI separated from the third DCI by at least the minimum time separation.

4. The method of claim 1, further comprising:
    sending, by the network, to the UE, the first MO pattern, the first MO pattern not complying with the span pattern requirement, and
    sending, by the network, to the UE, a first DCI, and a second DCI separated from the first DCI by at least the minimum time separation.

5. The method of claim 4, wherein the minimum time separation requirement specifies an absence of a DCI in a symbol immediately following a symbol with a DCI, the method further comprising disabling, by the UE, DCI reception during a symbol immediately following the first DCI.

6. The method of claim 1, further comprising:
    sending, by the network, to the UE, the first MO pattern, the first MO pattern complying with the span pattern requirement, and
    sending, by the network, to the UE, a first DCI, and a second DCI separated from the first DCI by at least the minimum time separation.

7. The method of claim 6, wherein the minimum time separation requirement specifies an absence of a DCI in a symbol immediately following a symbol with a DCI, the method further comprising:
    sending, by the network, to the UE, a notification that the network will comply with the minimum time separation requirement; and
    disabling, by the UE, DCI reception during a symbol immediately following the first DCI.

8. A method, comprising:
    receiving, by a network, from a first user equipment (UE), a physical downlink control channel (PDCCH) monitoring capability report; and
    receiving, by the network, from a second UE, the PDCCH monitoring capability report,
    the PDCCH monitoring capability report including:
        a span pattern requirement specifying one or more restrictions on lengths and separations, and
        a minimum time separation requirement, the minimum time separation requirement specifying a minimum time separation between downlink control informations (DCIs)
    generating, by the network, in response to the PDCCH monitoring capability report, a first monitoring occasion (MO) pattern.

9. The method of claim 8, further comprising:
    sending, by the network, to the first UE, the first MO pattern, the first MO pattern complying with the span pattern requirement, and
    sending, by the network, to the first UE, a first DCI, and a second DCI separated from the first DCI by less than the minimum time separation.

10. The method of claim 9, further comprising:
    sending, by the network, to the second UE, a second monitoring occasion (MO) pattern, not complying with the span pattern requirement, and
    sending, by the network, to the second UE, a third DCI, and a fourth DCI separated from the third DCI by at least the minimum time separation.

11. The method of claim 8, further comprising:
    sending, by the network, to the first UE, the first MO pattern, the first MO pattern not complying with the span pattern requirement, and
    sending, by the network, to the first UE, a first DCI, and a second DCI separated from the first DCI by at least the minimum time separation.

12. The method of claim 11, wherein the minimum time separation requirement specifies an absence of a DCI in a symbol immediately following a symbol with a DCI, the method further comprising disabling, by the first UE, DCI reception during a symbol immediately following the first DCI.

13. The method of claim 8, further comprising:
    sending, by the network, to the first UE, the first MO pattern, the first MO pattern complying with the span pattern requirement, and sending, by the network, to the first UE, a first DCI, and a second DCI separated from the first DCI by at least the minimum time separation.

14. The method of claim 13, wherein the minimum time separation requirement specifies an absence of a DCI in a symbol immediately following a symbol with a DCI, the method further comprising:
sending, by the network, to the first UE, a notification that the network will comply with the minimum time separation requirement; and
disabling, by the first UE, DCI reception during a symbol immediately following the first DCI.

15. A system, comprising:
a network, comprising a first processing circuit; and
a user equipment (UE), comprising a second processing circuit,
the second processing circuit being configured to report, to the network, a physical downlink control channel (PDCCH) monitoring capability report, the PDCCH monitoring capability report including:
a span pattern requirement specifying one or more restrictions on lengths and separations, and
a minimum time separation requirement, the minimum time separation requirement specifying a minimum time separation between downlink control informations (DCIs).

16. The system of claim 15, wherein the first processing circuit is configured to:
send, to the UE, a first monitoring occasion (MO) pattern, complying with the span pattern requirement, and
send, to the UE, a first DCI, and a second DCI separated from the first DCI by less than the minimum time separation.

17. The system of claim 16, wherein the first processing circuit is further configured to:
send, to the UE, a second monitoring occasion (MO) pattern, not complying with the span pattern requirement, and
send, to the UE, a third DCI, and a fourth DCI separated from the third DCI by at least the minimum time separation.

18. The system of claim 15, wherein the first processing circuit is further configured to:
send, to the UE, a first monitoring occasion (MO) pattern, not complying with the span pattern requirement, and
send, to the UE, a first DCI, and a second DCI separated from the first DCI by at least the minimum time separation.

19. The system of claim 18, wherein the minimum time separation requirement specifies an absence of a DCI in a symbol immediately following a symbol with a DCI, and
wherein the second processing circuit is further configured to disable DCI reception during a symbol immediately following the first DCI.

20. The system of claim 15, wherein the minimum time separation requirement specifies an absence of a DCI in a symbol immediately following a symbol with a DCI wherein:
the first processing circuit is further configured to:
send, to the UE, a first monitoring occasion (MO) pattern, complying with the span pattern requirement,
send, to the UE, a first DCI, and a second DCI separated from the first DCI by at least the minimum time separation, and
send, to the UE, a notification that the network will comply with the minimum time separation requirement; and
the second processing circuit is further configured to disable DCI reception during a symbol immediately following the first DCI.

* * * * *